United States Patent [19]

Wilson

[11] Patent Number: 5,602,868
[45] Date of Patent: Feb. 11, 1997

[54] MULTIPLE-MODULATION COMMUNICATION SYSTEM

[75] Inventor: Alan L. Wilson, Hoffman Estates, Ill.

[73] Assignee: Motorola, Inc., Schaumburg, Ill.

[21] Appl. No.: 445,572

[22] Filed: May 22, 1995

Related U.S. Application Data

[63] Continuation of Ser. No. 18,589, Feb. 17, 1993, abandoned.

[51] Int. Cl.$^6$ ........................................ H04B 1/38
[52] U.S. Cl. .................... 375/219; 375/216; 375/269;
375/273; 375/279; 375/300; 375/303; 375/308;
375/320; 375/323; 375/329; 375/334; 375/340;
455/73; 455/102; 455/142; 455/205; 332/100;
332/103; 332/108; 332/120; 332/151; 329/300;
329/304; 329/317; 329/348
[58] Field of Search ..................... 375/260, 268,
375/269, 216, 271, 219, 272–275, 279,
281, 283, 300, 302, 303, 308, 320, 322,
323, 329, 334, 340; 332/117, 119, 120,
149, 144, 145, 151, 100, 103, 108; 455/42,
61, 62, 73, 93, 95, 102, 108, 111, 127,
142–144, 205, 343; 329/300, 304, 316,
317, 345, 348

[56] References Cited

U.S. PATENT DOCUMENTS

| | | |
|---|---|---|
| 3,378,773 | 9/1965 | Jeffers ........................................ 455/93 |
| 4,290,140 | 9/1981 | Malm ........................................ 375/79 |
| 4,660,192 | 4/1987 | Pomatto, Sr. ........................... 455/102 |
| 4,804,924 | 2/1989 | Chassaing et al. ..................... 455/142 |
| 4,939,789 | 7/1990 | Sakashita et al. ...................... 455/260 |
| 4,955,083 | 9/1990 | Phillips et al. ............................ 455/47 |
| 5,109,542 | 4/1992 | Ecklund ................................... 455/142 |
| 5,155,455 | 10/1992 | Cowley et al. ......................... 455/102 |
| 5,163,159 | 11/1992 | Rich et al. .............................. 455/142 |
| 5,329,260 | 7/1994 | Poplin ..................................... 332/119 |
| 5,361,403 | 11/1994 | Dent ........................................ 455/74 |
| 5,491,832 | 2/1996 | Malkamaki ............................ 455/33.1 |

OTHER PUBLICATIONS

"Power Requirements" K. Sam Shanmugam; Digital Analog Communications Systems, 1979, p. 416.

*Primary Examiner*—Stephen Chin
*Assistant Examiner*—Amanda T. Le
*Attorney, Agent, or Firm*—Susan L. Lukasik

[57] ABSTRACT

A multiple-modulation communication system includes a transmitter that modulates and transmits communication signals modulated by a first modulation technique and communication signals modulated by a second modulation technique. The first modulation technique and the second modulation technique are different. The communication system also includes a receiver capable of receiving the communication signals modulated by the first modulation technique and the communication signals modulated by the second modulation technique and demodulating the communication signals.

22 Claims, 1 Drawing Sheet

5,602,868

MULTIPLE-MODULATION COMMUNICATION SYSTEM

This is a continuation of application Ser. No. 08/018,589, filed Feb. 17, 1993 and now abandoned.

FIELD OF THE INVENTION

This invention relates to radio frequency signals, including but not limited to transmission and reception of amplitude modulated (AM) and frequency modulated (FM) signals.

BACKGROUND OF THE INVENTION

A radio communication system permits transmission of information between a transmitter and a receiver. A radio frequency (RF) channel permits transmission of information between the transmitter and the receiver. By combining the information with an RF electromagnetic wave of a particular frequency, i.e., modulating the information signal onto a carrier frequency, the resultant modulated information signal may be transmitted through free space to a receiver. Various modulation techniques (e.g., amplitude (AM), frequency (FM), phase, and composite modulation) are known to combine the information signal with an electromagnetic wave. Communication units, such as portable radios, mobile radios, and base stations, contain transmitters and/or receivers.

A linear AM transmitter does not have as much coverage area, i.e., the signal does not travel as far, as an FM transmitter at the same peak transmit power level because the average envelope size of an AM transmission varies below the maximum output level, whereas the average envelope size of an FM transmission is constant at the maximum output level. An FM transmitter, however, uses more energy to transmit at the same power level as an AM transmitter, and hence the FM transmitter will more quickly drain the battery of a portable transmitter.

Accordingly, there is a need for a transmitter which has the low power characteristic of an AM transmitter while retaining the advantage of coverage area of an FM transmitter.

DESCRIPTION OF THE PREFERRED EMBODIMENT

The following describes an apparatus for and method of transmitting communication signals with a single transmitter and receiving the same signals with a single receiver. Additional communication range is obtained when transmitting FM signals. More efficient battery performance is achieved when transmitting linear AM signals. A single transmitter transmits both AM and FM signals. A single receiver capable of differentiating phase differences demodulates either AM or FM signals. Only one receiver is necessary, and there is no need to inform the receiver of what type of modulation was performed on the transmitted signal.

In the preferred embodiment, FM modulators have 12.5 kHz channels and linear AM modulators have 6.25 kHz channels. The receiver can be the same in either case. The form of modulation used in the present invention is called QPSK-c. This modulation technique is discussed in detail in U.S. Pat. No. 5,377,229 titled "Multi-Modulation Scheme Compatible Radio" filed on behalf of Alan L. Wilson et al. on Dec. 19, 1990, which information is enclosed herein by reference. QPSK stands for Quaternary Phase Shift Keying. QPSK-c, where the c stands for compatible, is a linear differential form of QPSK that is AM and FM compatible. It is possible to transmit with a higher average power using FM, and hence increased coverage area is obtained for the signal than when AM is used. An AM transmitter, however, consumes less power and hence is a more efficient user of a portable radio's battery charge or power than an FM transmitter. When using QPSK-c modulation, 4-level FSK (Frequency Shift Keying) is used in FM transmissions and D-QPSK (Differential QPSK) is used in AM transmissions. Switching from AM to FM yields higher average power, and hence increased coverage area for the signal, at the cost of battery charge. Thus range is enhanced and greater coverage is obtained for the same radio, or communication unit, when such coverage is desired. Conversely, switching from FM to AM when extended range is not necessary conserves battery charge. In the present invention, the communication unit changes its type of modulation and thus is more quickly responsive to such a change. This is accomplished by, inter alia, an x/(sin x) filter, where x=π fT in the preferred embodiment, and a phase angle integrator for the exponential function.

Figure 1:
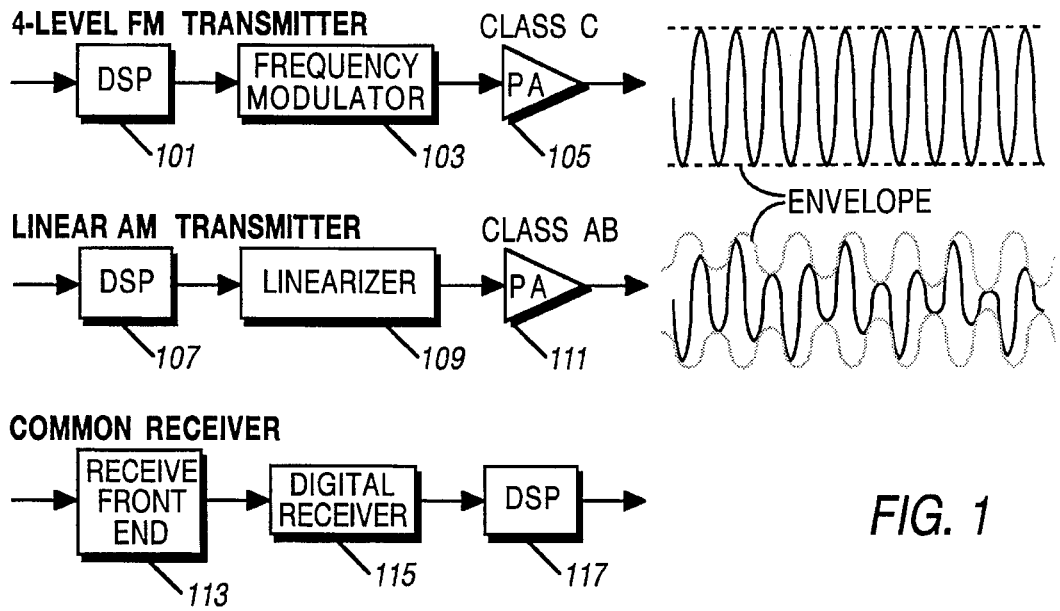
FIG. 1 shows an FM transmitter, an AM transmitter, and a common receiver in accordance with the invention.

One part of FIG. 1 shows a conventional four-level FM transmitter. Information to be transmitted enters a digital signal processor (DSP) 101. The DSP 101 processes the information and sends it to frequency modulator 103 which passes the information to power amplifier (PA) 105 which is rated class C. As shown in FIG. 1, a class C four-level FM transmitter transmits a constant envelope.

A conventional linear AM transmitter is also shown in FIG. 1. Information to be transmitted is processed in DSP 107 and output to a conventional linearizer 109, the output of which is input to a class AB power amplifier 111. As seen in the diagram, an AM signal has a non-constant envelope. The average signal power of an AM signal is less than the average signal power of an FM signal having the same peak envelope size.

Also shown in FIG. 1 is a common receiver which may receive information from both four-level FM transmitter and linear AM transmitters. The common receiver has a front-end receiver 113, a digital receiver 115, and a digital signal processor 117 that processes the information into data or audible speech. A linear AM transmitter has a time-varying amplitude that is reduced for high frequency deviation. Note that DSP 101, DSP 107, and DSP 117 also perform functions other than those shown. Throughout the specification and drawings, the DSP as shown may be a DSP 56001 available from Motorola, Inc.

Figure 2:
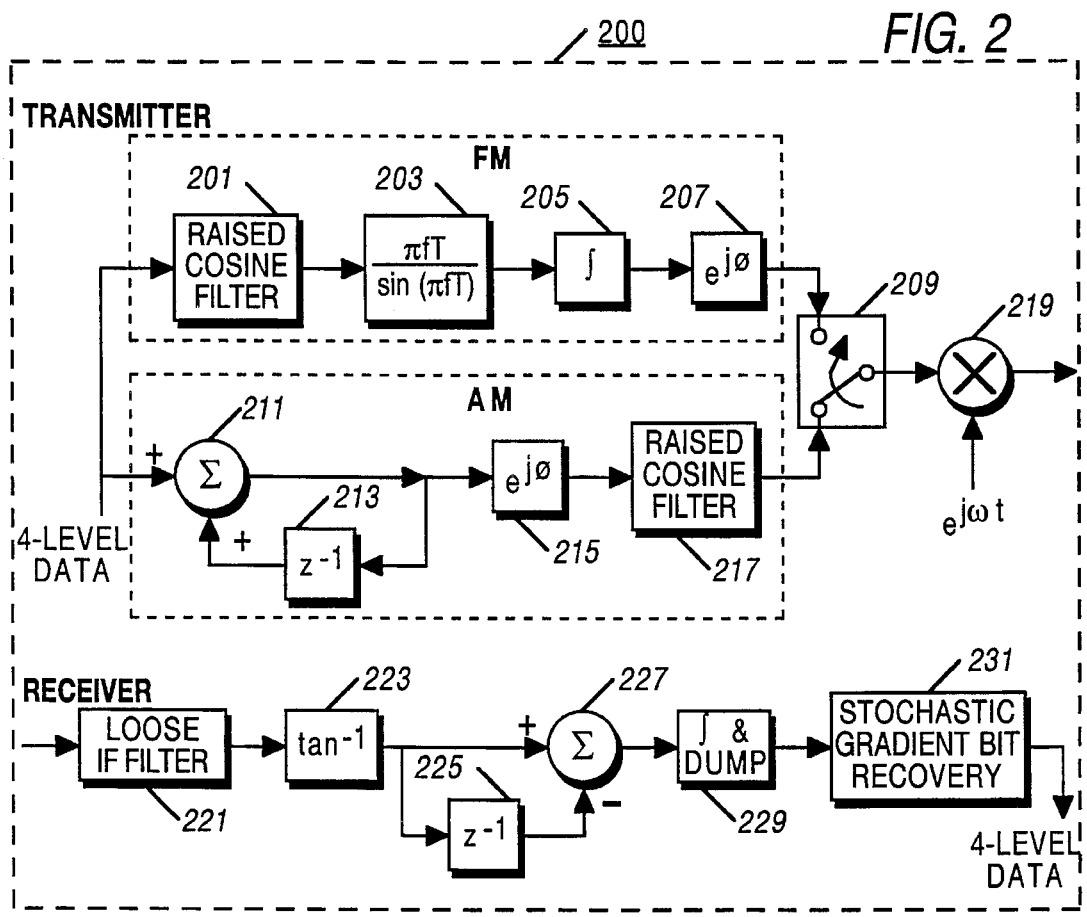
FIG. 2 shows a communication unit comprising a detailed FM transmitter, a detailed AM transmitter, and a detailed common receiver in accordance with the invention.

FIG. 2 shows a detailed implementation of the transmitters and receiver of FIG. 1. An FM transmitter, yielding 4-level FSK data, is shown by blocks 201, 203, 205 and 207. 4-level data is input to a raised-cosine filter 201 which is a splatter filter of the Nyquist raised-cosine finite impulse response type with splatter filter transition ratio alpha=0.2, as is known in the art. The FM transmitter includes a differential encoder comprised of blocks 203 and 205. A π fT/sin(π fT) filter 203 and an integrator 205 comprise the differential encoder. In the preferred embodiment, the integrator 205 is a simple integrator that uses the modulo 2 $\pi$ property of the phase to avoid overflowing, as is known in the art. The output of integrator 205 is the phase $\phi$ of the 4-level input signal. A detailed description of one implementation of the raised-cosine filter 201 and $\pi$ fT/sin($\pi$ fT) filter 203 follows in the next paragraph. Phase modulator 207 takes the phase $\phi$ and modulates it, creating a complex-valued result that is designated $e^{j\phi}$. The output, $e^{j\phi}$, of phase modulator is input to switch 209.

The cascaded filter implementation of the Nyquist raised-cosine filter 201 and the $\pi$ fT/sin($\pi$ fT) filter 203 may be implemented as follows. Let H($\omega$) equal the frequency response of an ideal Nyquist raised cosine filter. The normalized corner frequency is 1 radian/second, and the normalized symbol time (denoted by T) is $\pi$ seconds, and $$H(\omega) = 1 \quad \text{for } 1 - \alpha \geq |\omega|$$

$$H(\omega) = \frac{1}{2} + \frac{1}{2} \cos\left(\frac{\pi(|\omega| - 1 + \alpha)}{2\alpha}\right) \text{ for } 1 - \alpha < |\omega| \leq 1 + \alpha$$

$$H(\omega) = 0 \quad \text{for } 1 + \alpha < |\omega|.$$

The impulse response, h(t), of the filter is found with the inverse Fourier transform, and noting that H($\omega$) is an even function:

$$\begin{aligned} h(t) &= \frac{1}{2\pi} \int_{-\infty}^{\infty} H(\omega) e^{j\omega t} d\omega = \frac{1}{\pi} \int_0^{\infty} H(\omega) \cos(\omega t) \, d\omega \\ &= \frac{1}{\pi} \int_0^{1-\alpha} \cos(\omega t) \, d\omega + \frac{1}{2\pi} \int_{1-\alpha}^{1+\alpha} \cos(\omega t) \, d\omega + \\ &\quad \frac{1}{2\pi} \int_{1-\alpha}^{1+\alpha} \cos\left(\frac{\pi(\omega - 1 + \alpha)}{2\alpha}\right) \cos(\omega t) \, d\omega \end{aligned}$$

Using the identity cos(x) cos(y)=0.5 cos(x+y)+0.5 cos(x−y) and performing the integration:

$$h(t) = \frac{\sin[(1-\alpha)t]}{\pi t} + \frac{\sin[(1+\alpha)t] - \sin[(1-\alpha)t]}{2\pi t} +$$

$$\frac{\sin[\pi + (1+\alpha)t] - \sin[(1-\alpha)t]}{4\pi \left(\frac{\pi}{2\alpha} + t\right)} +$$

$$\frac{\sin[\pi - (1+\alpha)t] + \sin[(1-\alpha)t]}{4\pi \left(\frac{\pi}{2\alpha} - t\right)}.$$

Using the identity sin($\pi$+x)=−sin(x), regrouping terms, and then using the identity sin(x+y)+sin(x−y)=2 sin(x) cos(y):

$$h(t) = \frac{\pi}{8\alpha^2 t} \cdot \frac{\sin[(1+\alpha)t] + \sin[(1-\alpha)t]}{\left(\frac{\pi}{2\alpha}\right)^2} = \frac{\pi \sin(t) \cos(\alpha t)}{\alpha^2}.$$

The filter function h(t) can be sampled at discrete time intervals to realize the Nyquist raised-cosine finite impulse response filter 201.

The shaping filter, f(t), is derived as follows, where F($\omega$) is the frequency response of the shaping filter, T is the symbol time which equals 208.333 $\mu$sec for 9600 bits per second which equals $\pi$ seconds for the normalized system used in H above, and $$F(\omega) = \frac{\omega T/2}{\sin(\omega T/2)} \quad \text{for all frequencies.}$$

The frequency range of interest for F($\omega$) is −1.2 $\pi$<$\omega$T<1.2 $\pi$, which is the frequency range covered by the Nyquist filter H($\omega$) when the roll-off factor $\alpha$=0.2. In order to find a suitable impulse response, the function F will be approximated with a Fourier series of cosine terms, and the result will be transformed to the time domain.

A time interval to approximate F is first selected to be ±1.33333 $\pi$, because it must exceed ±1.2 $\pi$ and be less than ±2 $\pi$ because there is a singularity in F at $\omega$T=2 $\pi$. The Fourier series expansion follows, where x is the normalized frequency:

$$F(x) = \frac{\pi x}{\sin(\pi x)} = f_0 + \sum_{k=1}^{\infty} f_k \cos\left(\frac{2\pi k x}{1.33333}\right) \text{ where } x = fT = \frac{\omega T}{2\pi},$$

$$f_0 = 0.75 \int_{-2/3}^{2/3} F(x) \, dx, \text{ and}$$

$$f_k = 1.5 \int_{-2/3}^{2/3} F(x) \cos\left(\frac{2\pi k x}{1.33333}\right) dx \quad \text{for } k > 0.$$

These integrals are easily evaluated numerically. The first twelve terms appear in the following table.

| k | $f_k$ | k | $f_k$ |
| --- | --- | --- | --- |
| 0 | 1.35697 | 6 | 0.0281791 |
| 1 | −0.4839 | 7 | −0.0210304 |
| 2 | 0.189043 | 8 | 0.0162746 |
| 3 | −0.0982102 | 9 | −0.0129571 |
| 4 | 0.0594481 | 10 | 0.0105541 |
| 5 | −0.0396059 | 11 | −0.00875928 |

Performing the inverse Fourier transform on the series as follows:

$$\begin{aligned} f(t) &= \frac{1}{2\pi} \int_{-\infty}^{\infty} F(\omega) e^{j\omega t} d\omega = \\ &\quad \frac{1}{2\pi} \int_{-\infty}^{\infty} \left(f_0 + \sum_{k=1}^{\infty} f_k \cos\left(\frac{2\pi k x}{1.33333}\right)\right) e^{j\omega t} d\omega \\ &= \frac{1}{2\pi} \left(f_0 \delta(t) + \sum_{k=1}^{\infty} \frac{f_k}{2} \delta(0.75 \, kT) + \sum_{k=1}^{\infty} \frac{f_k}{2} \delta(-0.75 \, kT)\right) \end{aligned}$$

where $\delta$(t) represents the Dirac delta function. Sampling at 8 samples per symbol yields non-zero samples and 0.75×8=6 sample intervals. The middle or 0th sample has amplitude $f_0$, and the remaining samples have amplitudes $f_k$/2 for k=±1, ±2, ±3, ... Cascading the previously computed h(t) with f(t) yields the filters necessary for an FM $\pi$/4 DQPSK-c transmitter, as used in the preferred embodiment of the present invention. Although the above implementation is shown in band-limited form, band-limiting is optional and is not required for the present invention.

The AM transmitter, yielding D-QPSK data, is comprised of blocks 211, 213, 215, and 217. Four level data having levels of ±$\pi$/4 and ±3 $\pi$/4 enters a differential encoder comprised of a summer 211 and a delay 213. The output of this differential encoder enters a phase modulator 215, where the output of the phase modulator 215 has complex components I and Q at one sample per symbol. I represents the in-phase component, and Q represents the quadrature component. The output of modulator 215 is input to raised cosine filter 217 with alpha=0.2 where raised cosine filter 217 is similar to raised cosine filter 201. The output of raised cosine filter 217 is input to switch 209. Whichever form of transmission is selected, either FM or AM, the output of that part of the transmitter is input to modulator 219, which modulates the signal to the carrier frequency $\omega$.

Blocks 211, 213, and 215 each operate at the rate of one sample/symbol or 4800 symbols/second. Blocks 201 and 217 interpolate from 1 sample/symbol to N samples/symbol at the output, where N is usually 10 or more, but at least greater than one. Blocks 203, 205, and 207 each operate at N samples/symbol.

For efficiency and to eliminate redundant parts in the preferred embodiment, only one class AB PA is used in the transmitter, thus the linear AM transmitter configuration of FIG. 1 is used to embody the entire transmitter of FIG. 2, blocks 201 through 219 inclusive. Because the preferred embodiment of the present invention uses a DSP, transmitter blocks 201, 203, 205, 207, 209, 211, 213, 215, 217, and 219 are easily implemented in the DSP 107 of the linear AM transmitter. Because blocks 201 through 219 are included in the DSP 107, it is unnecessary to duplicate DSP 101, frequency modulator 103, and PA 105. The modulator 219 is also implemented in the DSP 107, and the output of the modulator 219 is input to the linearizer 109 prior to transmission.

A detailed common receiver is also shown in FIG. 2. In the preferred embodiment, the receiver blocks 221, 223, 225, 227, 229, and 231 are all implemented in the DSP 117. When the receiver and transmitter are in the same communication unit or radio 200, one or more DSPs may be used to support the functions of DSP 107 and DSP 117. A loose IF (intermediate frequency) filter 221, first receives a modulated signal. The output of the loose IF filter 221 is input to inverse tangent function 223, which is part of a frequency demodulator including blocks 223, 225 and 227. Blocks 225 and 227 are also part of a differential encoder also including integrate and dump filter 229, the function of which is described in detail in the following paragraph. The output of block 223 is input to summer 227 and the positive form of the delayed component is subtracted from block 227 as output from block 225. The output of integrate and dump filter 229 is input to stochastic gradient bit recovery block 231 the output of which is four level data as transmitted initially. Stochastic gradient bit recovery is well known in the art. Because the receiver is sensitive only to phase, the envelope does not matter and both FM and AM transmission may be received and properly decoded by this common receiver. Thus, because a more powerful AM PA is required than for an FM PA for the same range, a switch of the two modulations temporarily although draining more power gains extra (greater) coverage area.

The impulse response for the integrate and dump filter 229 is derived below, in a closed-form solution that is expressed in terms of the sine integral function Si(x), which is well known in the art. A band-limited integrate and dump filter is achieved when a portion of the side lobes are filtered out of the frequency response. The portion of the frequency response that is necessary for good fidelity in the symbol recovery is in the range $-(1+\alpha)/(2T)$ Hz to $(1+\alpha)/(2T)$ Hz. Because of a spectral null at 1/T Hz, the response is restricted to 1/T Hz cutoff. Where H(x) is the frequency response of a band-limited integrate and dump filter:

$$H(x) = \frac{\sin(\pi x)}{\pi x} \quad \text{for } |x| < 1$$
$$H(x) = 0 \quad \text{for } |x| \geq 1$$

Where h(t) is the impulse response of the filter H(x), $\omega = 2\pi x$, and H($\omega$) is an even function:

$$h(t) = \frac{1}{2\pi} \int_{-\infty}^{\infty} H(\omega) e^{j\omega t} d\omega = \frac{1}{2\pi} \int_{-2\pi}^{2\pi} \frac{\sin(\omega/2)}{\omega/2} e^{j\omega t} d\omega$$

$$= \frac{1}{\pi} \int_{0}^{2\pi} \frac{2}{\omega} \sin(\omega/2) \cos(\omega t) d\omega$$

$$= \frac{1}{\pi} \int_{0}^{2\pi} \frac{1}{\omega} (\sin[(t+1/2)\omega] - \sin[(t-1/2)\omega]) d\omega$$

$$= \frac{1}{\pi} \left( \int_{0}^{2\pi(t+1/2)} \sin(y) \frac{dy}{y} - \int_{0}^{2\pi(t-1/2)} \sin(y) \frac{dy}{y} \right)$$

$$= \frac{1}{\pi} (Si[2\pi(t+1/2)] - Si[2\pi(t-1/2)])$$

where $Si(x) = \int_{0}^{x} \sin(t) \frac{dt}{t}$.

Although the above implementation is shown in band-limited form, band-limiting is optional and is not required for the present invention.

Hence in the present invention, when it is desired for any reason by command or as determined by the radio, the radio will automatically switch from AM to FM to gain extra range for a particular signal. The radio or communication unit may also receive a signal, such as from a base station or other controlling unit including another radio, instructing it to transmit with a particular modulation. Similarly, the radio will automatically switch from FM to AM to gain better battery efficiency. This switching takes place in switch 209, which is controlled by a DSP in the preferred embodiment.

Although the preferred embodiment uses QPSK-c modulation, a common receiver can still be used for any modulation that distinguishes data by phase, i.e., where all the constellation points fall on a circle, such as QPSK, D-QPSK, and CORPSK (Correlated PSK).

Although a DSP is used to perform many of the functions of the present invention, discrete elements or other programmable logic may also be used and will achieve the same effect.

What is claimed is:

1. A communication system comprising:

a transmitter arranged and constructed to transmit communication signals modulated by a first modulation technique when low power consumption by the transmitter is desired and communication signals modulated by a second modulation technique when greater signal coverage by the transmitter is desired, wherein the first modulation technique and the second modulation technique are different; and a receiver for receiving the communication signals modulated by the first modulation technique and the communication signals modulated by the second modulation technique and demodulating the communication signals using a single demodulator having a single demodulation path, wherein both the communication signals modulated by the first modulation technique and the communication signals modulated by the second modulation technique are demodulated using the single demodulation path.

2. The communication system of claim 1, wherein the first modulation technique is a form of phase shift keying and the second modulation technique is a form of frequency shift keying.

3. The communication system of claim 1, wherein the first modulation technique is differential quaternary phase shift keying and the second modulation technique is 4-level frequency shift keying.

4. A radio frequency communication unit, comprising a receiver, arranged and constructed to receive at least two modes of communication of communication signals, and a transmitter, arranged and constructed to transmit the at least two modes of communication of communication signals, wherein the two modes of communication comprise:
- a first mode of communication comprising transmission of a non-constant envelope amplitude modulated signal when transmission with more efficient power consumption is desired; and
- a second mode of communication comprising transmission of a constant envelope frequency modulated signal when transmission of higher average power is desired, wherein the non-constant envelope amplitude modulated signal is modulated using a form of phase shift keying or the constant envelope frequency modulated signal modulated using a form of frequency shift keying.

5. The radio frequency communication unit of claim 4, wherein the non-constant envelope amplitude modulated signal is modulated using differential quaternary phase shift keying.

6. The radio frequency communication unit of claim 4, wherein the constant envelope frequency modulated signal is modulated using 4-level frequency shift keying.

7. The radio frequency communication unit of claim 4, wherein the first mode of communication is utilized when low power consumption by a transmitter of the communication signals is desired.

8. The radio frequency communication unit of claim 4, wherein the second mode of communication is utilized when greater signal coverage by a transmitter of the communication signals is desired.

9. A communication unit comprising:
- a first modulator, arranged and constructed to modulate communication signals by a first modulation technique, producing a first modulated signal;
- a second modulator, arranged and constructed to modulate communication signals by a second modulation technique, producing a second modulated signal, wherein the first modulation technique and the second modulation technique are different, and wherein the first modulated signal is modulated using a form of phase shift keying or the second modulated signal is modulated using a form of frequency shift keying;
- a selector, arranged and constructed to select the first modulated signal when transmission with more efficient power consumption is desired and the second modulated signal when transmission of higher average power is desired, producing a selected signal; and
- a transmitter for transmitting the selected signal.

10. The communication unit of claim 9, wherein the first modulation technique is differential quaternary phase shift keying.

11. The communication unit of claim 9, wherein the second modulation technique is 4-level frequency shift keying.

12. The communication unit of claim 9, wherein the first modulated signal is selected when low power consumption by the transmitter is desired.

13. The communication unit of claim 9, wherein the second modulated signal is selected when greater signal coverage by the transmitter is desired.

14. A method of transmitting a communication signal with a communication unit comprising the steps of:
- modulating the communication signal by a first modulation technique, producing a first modulated signal;
- modulating the communication signal by a second modulation technique, producing a second modulated signal, wherein the first modulation technique and the second modulation technique are different, and wherein the first modulated signal is modulated using a form of phase shift keying or the second modulated signal is modulated using a form of frequency shift keying;
- selecting the first modulated signal when low power consumption by a transmitter of the selected signal is desired and the second modulated signal when greater signal coverage by a transmitter of the selected signal is desired, producing a selected signal; and
- transmitting the selected signal.

15. The method of claim 14, wherein the first modulation technique is differential quaternary phase shift keying.

16. The method of claim 14, wherein the second modulation technique is 4-level frequency shift keying.

17. The method of claim 14, wherein the first modulated signal is selected when transmission with more efficient power consumption is desired.

18. The method of claim 14, wherein the second modulated signal is selected when transmission of higher average power is desired.

19. A communication unit comprising:
- a transmitter that transmits communication signals modulated by an amplitude modulation technique and communication signals modulated by a frequency modulation technique; and
- a receiver comprising a single demodulator, arranged and constructed to receive and demodulate both the communication signals modulated by the amplitude modulation technique and the communication signals modulated by the frequency modulation technique, wherein the single demodulator has a single demodulation path and wherein both the communication signals modulated by the amplitude modulation technique and the communication signals modulated by the frequency modulation technique are demodulated using the single demodulation path.

20. The communication unit of claim 19, wherein the communication signals modulated by the amplitude modulation technique are transmitted when low power consumption by the transmitter is desired.

21. The communication unit of claim 19, wherein the communication signals modulated by the frequency modulation technique are transmitted when greater signal coverage by the transmitter is desired.

22. A communication unit comprising:
- a transmitter that transmits communication signals modulated by an amplitude modulation technique when low power consumption by the transmitter is desired, and transmits communication signals modulated by a frequency modulation technique when greater signal coverage by the transmitter is desired; and
- a receiver comprising a single demodulator having a single demodulation path, arranged and constructed to receive and demodulate both the communication signals modulated by the amplitude modulation technique and the communication signals modulated by the frequency modulation technique, wherein both the communication signals modulated by the amplitude modulation technique and the communication signals modulated by the frequency modulation technique are demodulated using the single demodulation path.

* * * * *

UNITED STATES PATENT AND TRADEMARK OFFICE
CERTIFICATE OF CORRECTION

PATENT NO. : 5,602,868
DATED : February 11, 1997
INVENTOR(S) : Alan L. Wilson

It is certified that error appears in the above-indentified patent and that said Letters Patent is hereby corrected as shown below:

In Column 7, line 20 of Claim 4 please add --is-- between "signal" and "modulated".

Signed and Sealed this

Seventh Day of October, 1997

Attest:

BRUCE LEHMAN

Attesting Officer

Commissioner of Patents and Trademarks